United States Patent [19]
Chudoba et al.

[11] Patent Number: 5,751,874
[45] Date of Patent: May 12, 1998

[54] COUPLING DEVICE FOR LINKING OPTICAL FIBER CONNECTORS

[75] Inventors: Paul Chudoba, Shohola; Jerome Polizzi, Morrisville, both of Pa.

[73] Assignee: NuVisions International, Inc., Shohola, Pa.

[21] Appl. No.: 714,797

[22] Filed: Sep. 13, 1996

[51] Int. Cl.$^6$ ............................................. G02B 6/38
[52] U.S. Cl. ...................... 385/72; 385/92; 385/88; 385/139
[58] Field of Search ........................... 385/56, 58, 60, 385/66, 67, 92, 84, 72, 139, 140, 88

[56] References Cited

U.S. PATENT DOCUMENTS

| | | | |
|---|---|---|---|
| 4,991,929 | 2/1991 | Bowen et al. | 350/96.21 |
| 5,082,345 | 1/1992 | Cammons et al. | 385/60 |
| 5,408,557 | 4/1995 | Hsu | 385/72 |
| 5,452,390 | 9/1995 | Bechtel et al. | 385/60 |

*Primary Examiner*—John Ngo
*Attorney, Agent, or Firm*—Charles S. McGuire; George R. McGuire

[57] ABSTRACT

A universal coupling device compatible with several industry-standard fiber optic connector styles to releasably couple the axial ferrule of one such connector in optical communication with the ferrule of another connector of the same or different style, or with the connector port of industry-standard test equipment. The device includes a split-spring bushing for receiving, in frictional engagement, a standard ferrule in either or both ends, and housing means defining a cavity closely surrounding the bushing and having coaxial bores aligned with the busing. The housing means is formed in two sections, mutually engageable by threaded or snap-fit connection. A spacer member may be positioned in the bushing to provide an air gap for controlled attenuation of light passing through the fibers of ferrules coupled by the device.

32 Claims, 5 Drawing Sheets

COUPLING DEVICE FOR LINKING OPTICAL FIBER CONNECTORS

BACKGROUND OF THE INVENTION

The present invention relates to apparatus for releasably connecting industry-standard optical fiber couplings to one another or to test equipment.

Single optical fibers or bundles of a plurality of fibers are coated with one or more layers of suitable protective material(s) to form an optical cable which is terminated at one or both ends by a connector. Various forms of optical cable connectors are in current use, the most popular currently being those identified as FC, SC and ST (the latter being a registered trademark of AT&T). All such connectors include a cylindrical, plastic ferrule in which the fiber(s) is/are embedded and extend axially through with the terminal end(s) of the fiber(s) exposed at the end of the ferrule. Although the length of the ferrule and the other connector structure may vary from one type of connector to another, the ferrules of all connectors are of substantially the same diameter.

Each type of industry-standard connector is adapted to be coupled to structurally compatible connection devices for axial alignment of the fiber(s) in the cable terminated by the connector with fiber(s) of another cable or with similar optical elements of testing apparatus or with other equipment. For example, when one end of an optical cable is to be connected to the input or output port of a conventional test light source or detector, the cable connector is coupled to a connector port adaptor which is structurally compatible with that type of connector. In some situations the terminal ends of the axially aligned fibers, or other optical elements are in mutual contact when the cables or other devices are coupled, while in other cases the ends are spaced by a predetermined distance to provide controlled attenuation of light passing therethrough.

Typical structures of connector adapters provide snap, threaded or key locking features requiring at least some degree of familiarity on the part of the operator with the structure of the connector and adaptor in order to perform the manual manipulations required to effect the connection. Also, the structure of conventional adapters makes cleaning difficult or impossible, resulting in a very short useful life, sometimes only a single use.

Accordingly, it is a principal object of the present invention to provide an inexpensive coupling device for fiber optic cables which is compatible with any and all of a variety of industry-standard, axial ferrule connectors.

A further object is to provide a simple yet highly effective coupling device compatible with a plurality of types of optical cable connectors, the device having a construction conducive to easy disassembly and cleaning.

Another object is to provide a unitary coupling adaptor adapted to connect any of a variety of optical cable connectors to the input/output ports of test equipment.

A still further object is to provide a connector device having novel and improved structure for creating controlled attenuation of light passing between optical elements operatively connected to one another by the device.

Other objects will in part be obvious and will in part appear hereinafter.

SUMMARY OF THE INVENTION

In a first embodiment, the coupling device of the invention consists of only three pieces, all essentially tubular in form, termed a main body, an end cap and a split spring bushing. The main body is externally threaded from one end for a portion of its length, having a smooth, cylindrical, external surface extending from the threaded portion to the opposite end. An axial, through bore includes a first portion extending from the end having the external threads for a portion of the bore axial length, separated by a radiused shoulder from a slightly smaller diameter, second portion extending the remainder of the bore length.

The end cap has an outer, cylindrical surface of larger diameter extending from one end to a portion of smaller diameter which extends to the other end. The through, axial bore in the end cap includes a first, internally threaded portion extending from the one end, within the portion having the larger diameter outer surface, separated by a stepped shoulder from a second, intermediate portion of smaller diameter than the first portion. The smooth, cylindrical surface of the second portion is separated by a radiused shoulder from a third portion, of somewhat smaller diameter than the second portion, which extends the remainder of the bore length.

The split spring bushing is cylindrical with smooth, inner and outer surfaces, the cylinder wall being divided by an axial slit extending the full length of the bushing. The outside diameter of the bushing is slightly smaller than the diameters of the first portion of the main body bore and the second portion of the end cap bore, and larger than the second and third portions of the bores in the main body and end cap, respectively. The device is assembled by inserting one end of the bushing into the first and second bore portions of the main body and end cap, respectively, and threading the externally threaded portion of the main body outer surface into the internally threaded portion of the end cap. When so assembled, the length of the bushing is slightly less than the full, combined lengths of the first and second portions of the main body and end cap bores, respectively, and the longitudinal axes of all three pieces are substantially coaxial. The inner diameter of the bushing is slightly less than the equal diameters of the second and third portions of the bores of the main body and end cap, respectively.

Two fiber optic cable connectors may be optically coupled by inserting the axial ferrule of one connector into the second diameter portion of the main body bore, and the ferrule of a second connector into the third diameter portion of the end cap. The standard diameters of the axial ferrules of all industry-standard connectors is slightly less than the diameters of the bores into which they are inserted and greater than the inside diameter of the bushing, providing a frictional fit while allowing easy withdrawal of the ferrules from the coupling device. The bushing is flexed radially outwardly by a small amount as the ferrules are inserted, but the outside diameter in the flexed condition remains less or not larger than the diameters of the bore portions containing the bushing. The axial lengths, as well as the diameters of the smaller diameter portions of both the main body and the end cap are such that there is no interference with structural portions of the connectors which would prevent insertion to the required extent of the connector ferrules, the terminal ends of which are in abutting contact within the spring bushing of the coupling device.

In a second embodiment, the main body and end cap are fabricated as molded plastic pieces. A pair of spaced arms on the end cap terminate in inwardly directed teeth. The main body includes two pairs of axially spaced, stepped shoulders on opposite sides of the external surface. The split spring bushing is positioned in portions of through bores in the main body and end cap, as in the first embodiment. The device is assembled by moving the main body and end cap axially toward one another until the teeth on the end cap snap over the first pair of shoulders on the main body, at which point the bushing is loosely retained between the radiused shoulders separating the larger and smaller diameter portions of the bores in the main body and end cap. If it is desired that the bushing be tightly engaged at its ends between the bore shoulders, the main body and end cap are pushed toward one another until the teeth snap over the second pair of shoulders. Cable connectors are coupled by the device in the same manner as in the first embodiment.

In another embodiment, the device is adapted to couple any industry-standard cable connector to the input or output port of test equipment. The main body and spring bushing are the same as in the first described embodiment. The end cap includes a through bore with a threaded portion at one end to receive the threaded end of the main body and a portion to receive one end of the bushing. The opposite end of the end cap is of enlarged diameter, both internally and externally, being internally threaded for connection to the standard, externally threaded nipple surrounding the input/output ports on fiber optic test equipment. When this embodiment of the coupling device is connected to test equipment, the axial ferrule of any industry-standard fiber optic cable connector may be inserted in the open end of the main body, thereby being optically connected to the test equipment. In a modification of this embodiment, the device of the first or second embodiment is used in its entirety with one end, either the main body or end cap, inserted in a bore of an adaptor having internal threads for connection to the input/output port. In a further modification, a light detector may be mounted in the end cap.

The coupling device may be modified to provide a controlled air gap between the terminal ends of optical elements connected thereby. A thin strip of material is frictionally engaged in the axial split in the bushing to extend radially inwardly for a short distance over the length of the bushing. A disc-like spacer member is formed with an outer circumference substantially equal to the inner circumference of the bushing, and a central opening. A notch having a width and radial length substantially equal to the corresponding dimensions of the portion of strip within the bushing is formed in the outer periphery of the spacer member. The spacer is positioned within the bushing with the strip extending into the spacer notch. When the coupled elements, e.g., axial ferrules of optical cable connectors, are inserted in the coupling device with their terminal end surfaces abutting opposite sides of the spacer member, light travels from one to the other through the opening in the spacer, with the air gap of precisely controlled length providing the desired attenuation.

The foregoing and other features of the invention will be more readily understood and fully appreciated from the following detailed description, taken in conjunction with the accompanying drawings.

DETAILED DESCRIPTION

Referring now to the drawings, in FIGS. 1–4 is shown a first embodiment of the coupling device of the invention, denoted generally by reference numeral 10. Device 10 comprises main body 12, end cap 14, and split spring bushing 16. Main body 12 is a tubular, machined, metal part having first and second cylindrical external surface portions 18 and 20, respectively. First portion 18 has a smooth surface and is of somewhat smaller diameter than second portion 20, which is threaded. A through bore includes relatively smaller and larger diameter, first and second portion 22 and 24 extending from the ends adjacent first and second surface portion 18 and 20, respectively, to meet at tapered shoulder 26.

End cap 14 includes relatively smaller and larger diameter, first and second, smooth, cylindrical, external surface portions 28 and 30, respectively. An internal bore includes relatively smaller diameter, first portion 32, a somewhat larger diameter, intermediate portion 34 and a third portion 36 significantly larger diameter. Smooth bore portions 32 and 34 meet at tapered shoulder 38, and intermediate portion 34 meets internally threaded portion 36 at stepped shoulder 40.

Figures 1, 2:
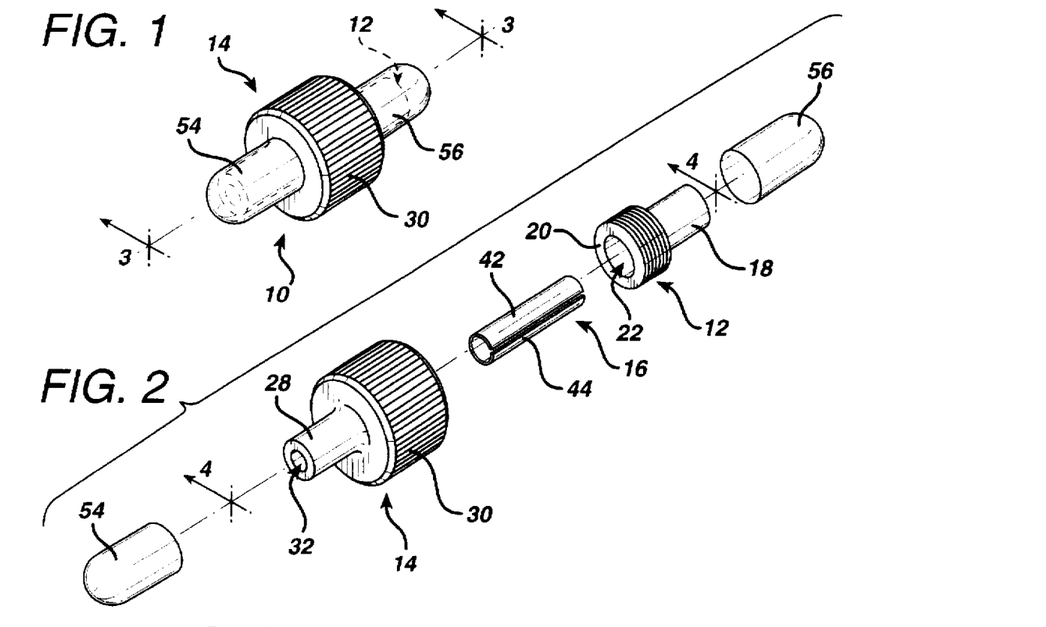
FIGS. 1 and 2 are perspective and exploded perspective views of a first embodiment of the coupling device of the invention.

Split spring bushing 16 consists of a hollow, open-ended, cylindrical body 42 divided axially by slit 44 (FIG. 2). The outside diameter D (FIG. 4) of bushing 16 is slightly smaller than the equal diameters of bore portions 24 and 34, and larger than the equal diameters of bore portions 22 and 32. The ends of bushing 16 are tapered inwardly at 46 and 48 from the outer diameter D to the inner diameter d. Preferably, bushing 16 is formed of Zirconia, or other suitable ceramic material, as opposed to metal.

Device 10 is assembled by placing opposite ends of bushing 16 in bore portions 24 and 34 of main body 12 and end cap 14, respectively, and threading portion 20 into portion 36. Relative dimensions are such that when main body 12 and end cap 14 are fully engaged, i.e., when the end surface of main body 12 abuts stepped shoulder 40, the length of bushing 16 is slightly less than the distance between tapered shoulders 26 and 38, as best seen in FIG. 3A.

Figure 3:
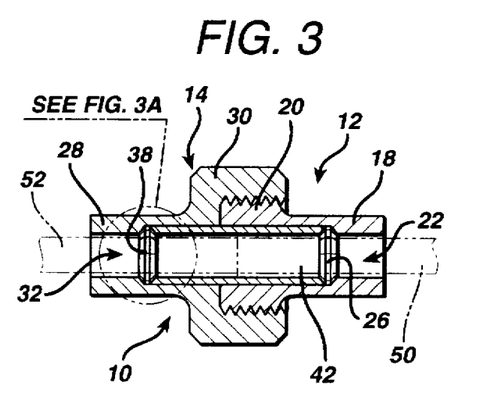
FIGS. 3 and 4 are side elevational views in section on the lines 3—3 and 4—4 of FIGS. 1 and 2, respectively.
Figure 3A:
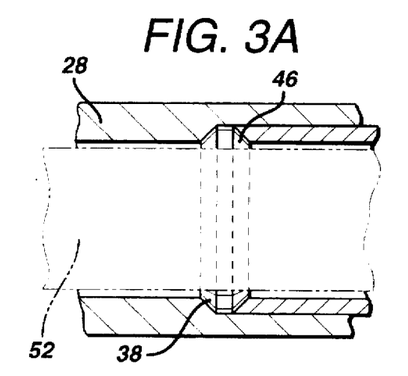
FIG. 3A is an enlarged fragment of FIG. 3.
Figure 4:
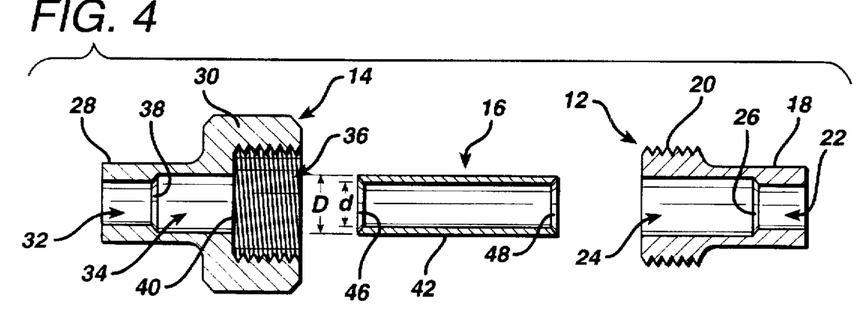

Device 10 is shown in fully assembled condition in FIGS. 1 and 3 with axial ferrules 50 and 52 of conventional connectors shown in phantom lines in FIG. 3, inserted into opposite ends of bushing 16 and frictionally engaged thereby. As indicated in FIG. 4, bushing 16 has outside and inside diameters of D and d, respectively, in its unflexed condition. The axial ferrules of all industry-standard optical fiber connectors, such as types FC, SC and ST, are of equal, predetermined diameter. Diameters D and d are larger and smaller, respectively, than the known diameter of the connector ferrules, whereby tapered ends 46 and 48 provide lead-ins for insertion of the ferrules into bushing 16, which is radially expanded by the ferrules. The diameters of bore portions 24 and 34 are at least as large as the outside diameter of bushing 16 in its radially expanded condition. Dust covers 54 and 56, of somewhat flexible plastic, are inserted over portions 18 and 28 of main body 12 and end cap 14, respectively, with frictional fit when device 10 is not in use.

Turning now to FIGS. 5–9, another embodiment of the device, denoted by reference numeral 10', is shown. Device 10' includes the same three major components as device 10, namely, main body 12', end cap 14' and split bushing 16'. While bushing 16' is identical to bushing 16, the configurations of main body 12' an end cap 14' are somewhat different than their counterparts of the first embodiment. Main body 12' includes cylindrical portion 58 which integrally adjoins rectangular portion 60 at stepped shoulders 62. Portion 60 includes first and second pairs of stepped shoulders 62 and 64, respectively. Relatively smaller and larger diameter portions 66 and 68, respectively, of a through, cylindrical bore adjoin one another at radiused shoulder 70.

Figure 5:
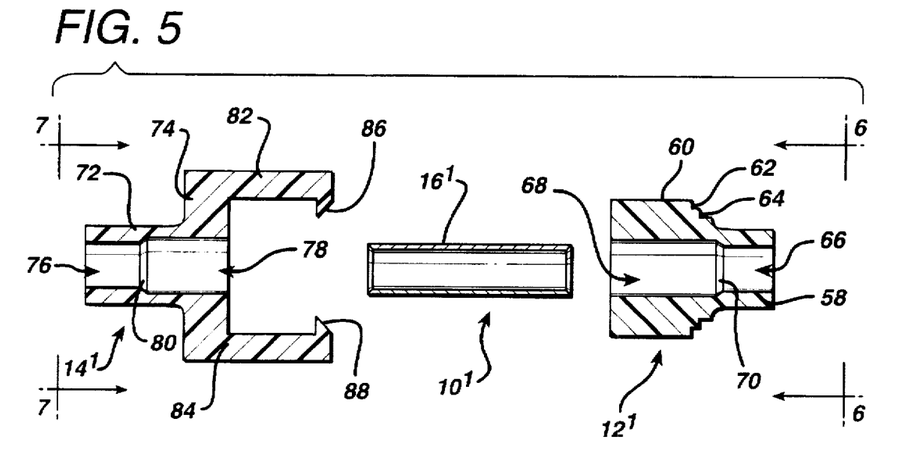
FIG. 5 is a side elevational view, in section, of a second embodiment of the device with the parts axially separated.
Figure 6:
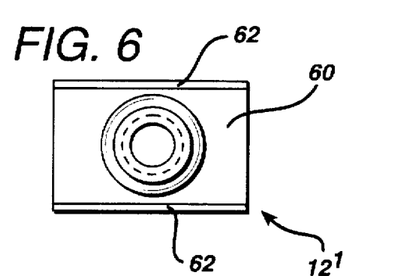
FIGS. 6 and 7 are end elevational views of two of the elements of FIG. 5, as seen from the lines 6—6 and 7—7, respectively.
Figure 7:
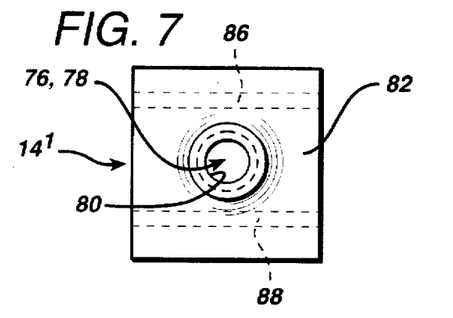

End cap 14' includes integral, cylindrical and rectangular portions 72 and 74, respectively. Relatively smaller and larger diameter portions 76 and 78, respectively, of a through, cylindrical bore adjoin one another at radiused shoulder 80. Bore portions 66 and 76 are of equal diameter, slightly larger than the standard diameter of connector ferrules, and bore portions 68 and 78 are also of equal diameter. Extending forwardly from rectangular portion 74, on opposite sides thereof, are arms 82 and 84 terminating in spaced, inwardly directed teeth 86 and 88, respectively, each extending linearly across the full width of end cap 14'.

Figure 8:
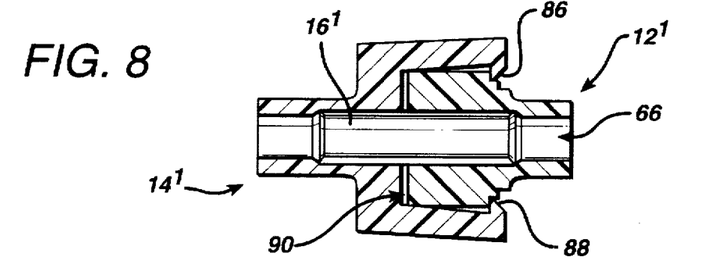
FIGS. 8 and 9 are sectional, side elevational views of the elements of FIG. 5, shown in first and second assembled positions.

Device 10' is assembled by placing opposite ends of bushing 16' in bore portions 68 and 78 and moving main body 12' and end cap 14' toward one another. Relative dimensions are such that the inwardly angled surfaces of teeth 86 and 88 contact the outer edges of portion 60 of main body 12'. The material of end cap 14', e.g., a suitable plastic, permits outward flexing of arms 82 and 84 as mating movement of the main body and end cap continues. As the crests of teeth 86 and 88 pass stepped shoulders 62, the inherent resilience of the material of end cap 14' causes arms 82 and 84 to move back toward their unflexed position, thereby engaging teeth 86 and 88 over shoulders 62 as shown in FIG. 8.

Figure 9:
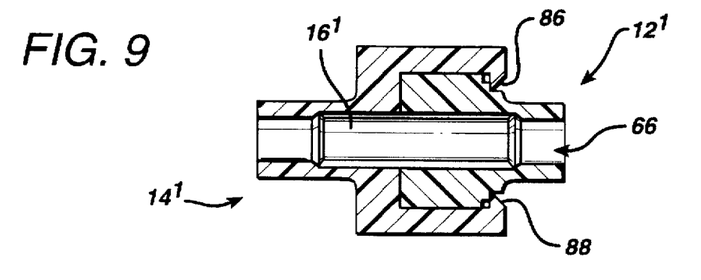

Relative dimensions are such that, when main body 12' and end cap 14' are connected to one another by engagement of teeth 86 and 88 over shoulders 62, the length of bushing 16' is less than the distance between radiused shoulders 70 and 80. Also, the diameter of bushing 16' in its unflexed condition is slightly less than the equal diameters of bore portions 68 and 78, whereby bushing 16' is loosely contained therein, as in the case of bushing 16 in the first-described embodiment. As indicated in FIG. 8, when the elements are so assembled there is a space 90 between opposing surfaces of main body 12' and end cap 14'. When these two elements are moved to bring their opposing surfaces into contact, as shown in FIG. 9, teeth 86 and 88 are engaged over stepped shoulders 64 of main body 12' to retain the elements in this position. Relative dimensions are such that, in this assembled condition, the ends of bushing 16' are firmly engaged between radiused shoulders 70 and 80, thus providing a more permanent type connection.

Figures 10, 11:
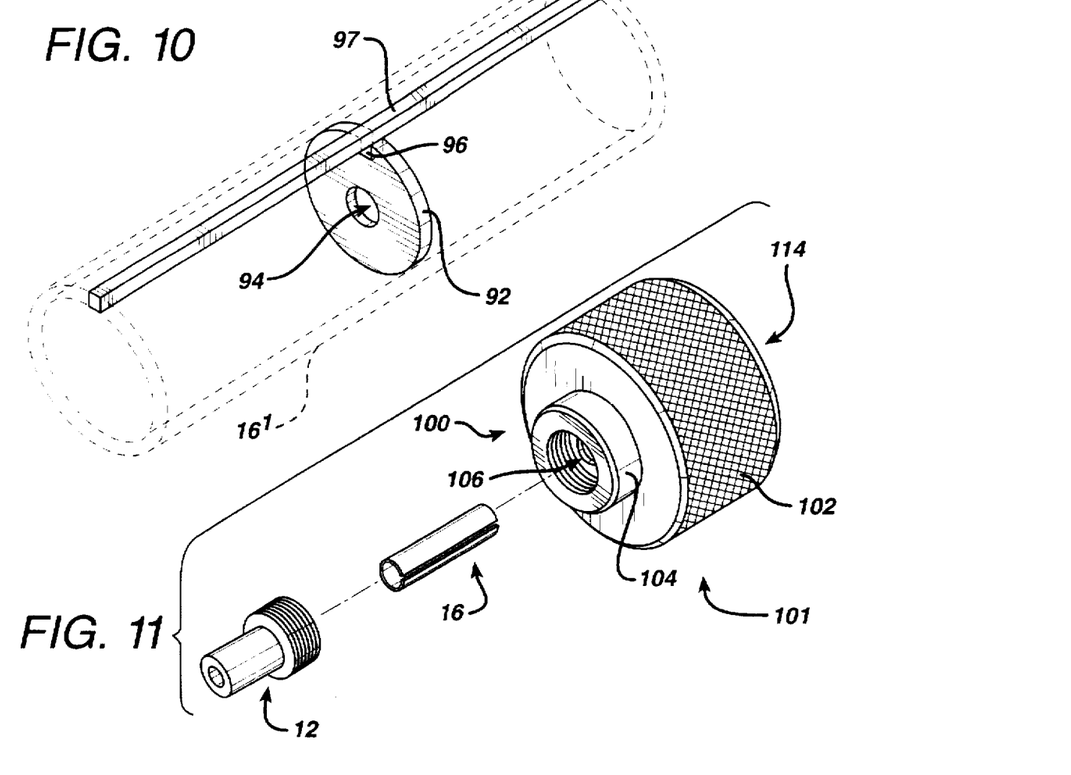
FIG. 10 is an enlarged, perspective view of an element of the device incorporating an optional modification.
FIGS. 11 is an exploded perspective of another embodiment, including portions of the first embodiment.
Figure 12:
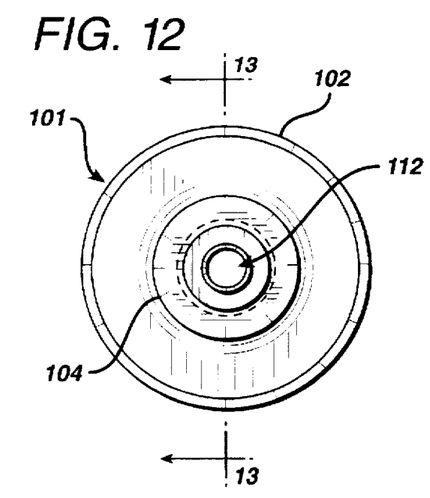
FIG. 12 is an end elevational view of the elements of FIG. 11.
Figure 13:
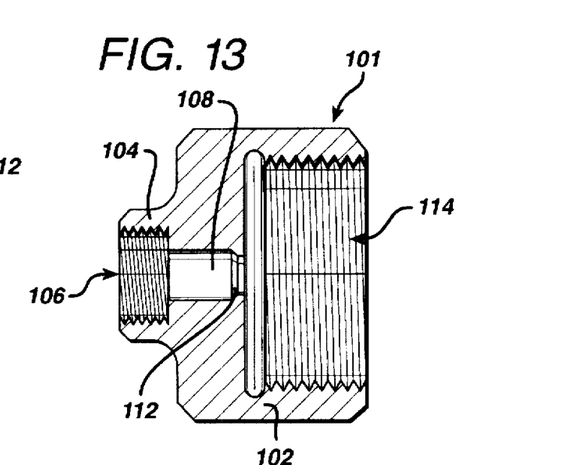
FIG. 13 is a side elevational view, in section on the line 13—13 of FIG. 12.

A further, optional feature which may be employed in conjunction with any of the illustrated embodiments is illustrated in FIG. 10. Spacer element 92 may be positioned in bushing 16 to provide controlled attenuation of the light passing between the fibers of ferrules which are coupled by device 10 or 10'. Spacer 92 is in the form of a circular disc having an open central portion 94 and notch 96 extending into its outer periphery. The outer diameter of spacer 92 is essentially equal to the inside diameter of bushing 16 in its unflexed position. Member 97, in the form of a thin strip of material, is positioned with force fit in the otherwise open slit in bushing 16. The height h of member 97 is substantially equal to the wall thickness of bushing 16 except for a central key 98 extending into notch 96 in spacer 92. Preferably, spacer 92 and member 97 are fixedly attached, e.g., by epoxy, before inserting member 97 in the slit of bushing 16. The terminal ends of axial ferrules inserted into opposite ends of bushing 16 abut opposite sides of, and are spaced by the thickness of, spacer 92. Controlled attenuation is provided by the air gap through opening 94 of the spacer. Spacer 92 is preferably of a material such as optical quality ruby which may be accurately machined to close tolerances.

A further embodiment, suitable for direct attachment to connector ports of test equipment, is shown in two modifications in FIGS. 11–16. Device 100 includes main body 12 and bushing 16 of the first embodiment and modified end cap 101, having external, cylindrical portions 102 and 104 of relatively large and small diameters, respectively. A through bore includes threaded portion 106, smooth, intermediate portions 108 and 110, adjoining at radiused shoulder 112, and threaded portion 114. The parts are assembled by placing opposite ends of bushing 16 in bore portions 24 (FIGS. 2, 4) and 108 of main body 12 and end cap 101, respectively, and threading portion 20 into bore portion 106. Threaded portion 114 is configured for engagement with the industry-standard, externally threaded nipple of fiber optic test equipment. The axial ferrule of any standard fiber optic connector may be inserted into main body 12 and frictionally engaged by bushing 16, thereby being optically coupled to the test equipment.

Figure 14:
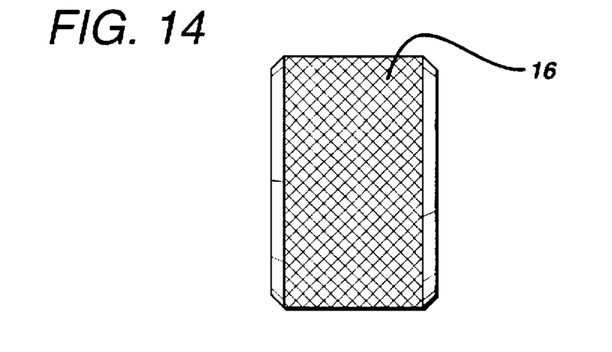
FIGS. 14 and 15 are side and end elevational views, respectively, of an adaptor for use with the device of FIGS. 1–4, or that of FIGS. 5–10.
Figure 15:
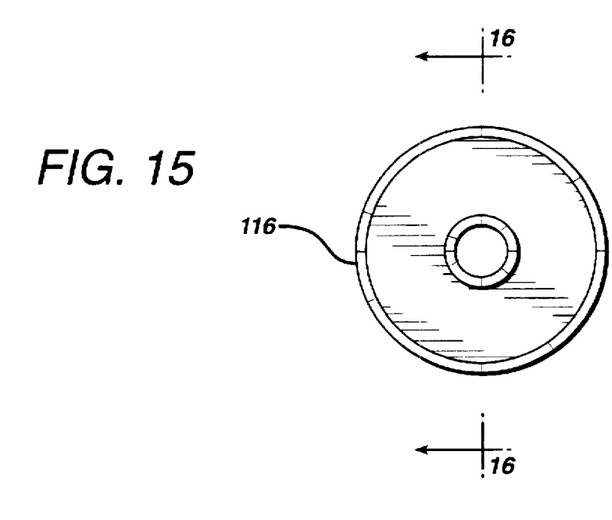
Figure 16:
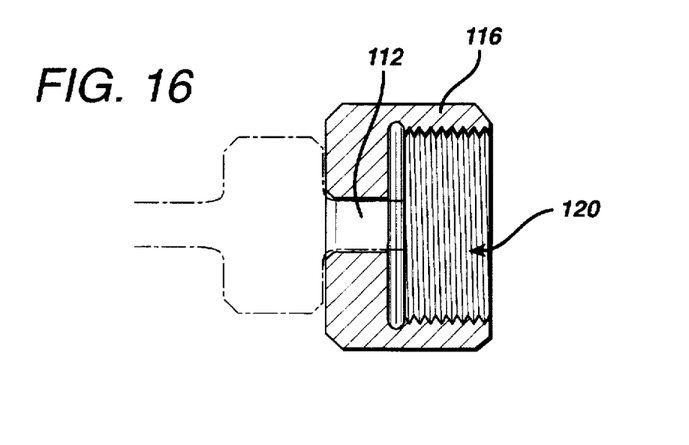
FIG. 16 is a side elevational view on the line 16—16 of FIG. 15, with the device of FIGS. 1–4 shown in phantom lines.

Adaptor member 116, shown in FIGS. 14–16, is a cylindrical part having a through bore including smooth portion 118 and threaded portion 120, configured for engagement with the connector port of standard test equipment. The diameter of bore portion 118 is slightly (e.g., 0.0035") larger than the equal, outside diameters of surface portions 18 and 58 of main bodies 12 and 12', respectively, and portions 28 and 72 of end caps 14 and 14', respectively. Thus, a fully assembled device 10 or 10' may be coupled to adaptor member 116, as shown in phantom lines in FIG. 16, to permit optical coupling of a fiber optic connector to test equipment.

Figure 17:
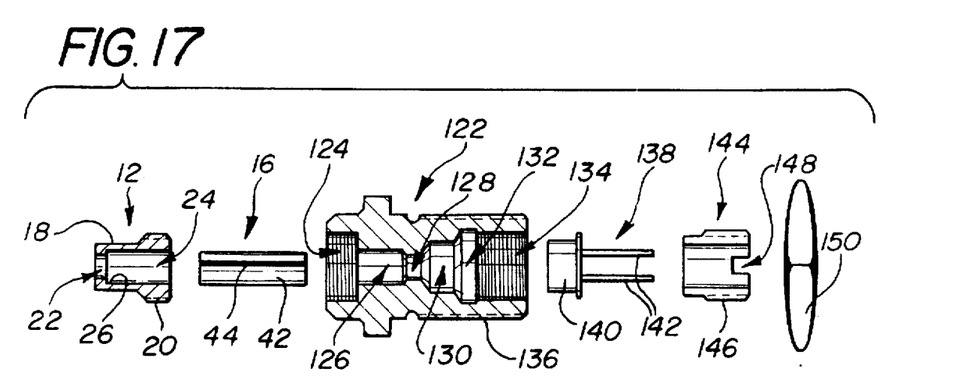
FIG. 17 is a side elevational view of another embodiment with parts axially separated and some parts in section.
Figure 18:
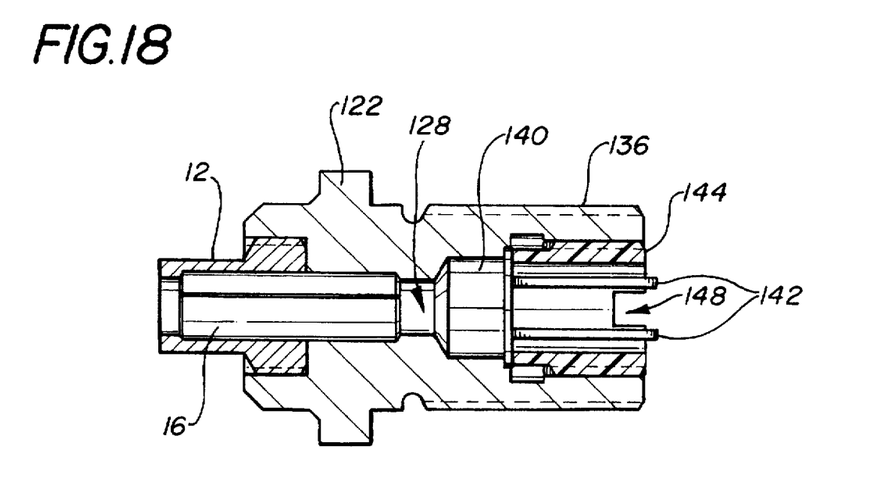
FIG. 18 is a side elevational view, with some parts in section, showing the elements of FIG. 17 in assembled relation.

The device of FIGS. 17 and 18 includes a main body and split spring bushing which are essentially the same as those of the previously described embodiment. Accordingly, the same reference numerals are used to denote main body 12, with smooth and threaded external portions 18 and 20, and with relatively smaller and larger bores 22 and 24 meeting at radiused shoulder 26, as well as bushing 16 with cylindrical body 42 and axial slit 44. End cap 122 includes threaded and smooth bore portions 124 and 126 for receiving threaded portion 20 of main body 12 and one end of bushing 16, respectively, as seen in FIG. 18. The through, axial bore of end cap 122 further includes portions 128, 130, 132 and 134, the latter being internally threaded. Also, external threads 136 extend from the end of end cap 122 opposite the end which receives main body 12.

Conventional photodetector 138 includes can portion 140 and electrical leads 142. Bore portion 130 is sized to receive the can portion of standard sized detectors with the flange at the base of the can abutting the shoulder where bore portions 130 and 132 meet. Hollow, cylindrical, plastic bushing 144 includes external threads 146 which mate with the threads of bore portion 134 and slots 148 for engagement by a suitable tool for tightening and loosening the threaded engagement of bushing 144 with end cap 122.

The components are assembled by threading main body 12 into one end of end cap 122 with spring bushing 16 positioned in bore portions 24 and 126, and inserting detector 138 in the opposite end of the end cap and securing the detector in position by threading bushing 144 into bore portion 134. Bore portion 128 is sized to accept any of several sizes of industry-standard photodetectors. It will be noted in FIG. 18 that leads 142 extend past the end of the device to provide electrical connection of detector 138 to test equipment upon which the device is mounted. Such mounting may be effected by engagement of threads 136 with mating threads surrounding a connector port on the test equipment. Nut 150 (FIG. 17) is threaded onto threads 136 and tightened against the front wall of the test equipment to retain the device in position. Rather than mounting the device by threaded connection of the end cap barrel to the test equipment, a conventional flange mounting plate may be provided. End cap 122 is made of anodized aluminum which, together with the dielectric material of bushing 144, provides electrical isolation of leads 142. It will further be noted that bore portion 128 ensures that the terminal end of a ferrule inserted in bushing 16 will be spaced from detector 138 by at least the axial length of bore portion 128, thereby providing protection of the detector from potential damage by the ferrule as well as an air gap for attenuation of light from the ferrule fiber(s). Thus, the axial ferrule of any standard fiber optic connector may be inserted in bushing 16 with light from the fiber impinging upon photodetector 138 which is electrically coupled to the test equipment.

From the foregoing, it will be apparent that the device of the invention provides a universal mating sleeve compatible with FC, ST and SC fiber optic connector styles. The device will releasably couple the axial ferrule of any of these connector styles with one another or with conventional test equipment, with or without attenuation. There is no key locking, threading or snapping associated with coupling and decoupling of the connectors, only axial push and pull. The device may be easily disassembled for cleaning, thus having a virtually unlimited useful life.

What is claimed is:

1. A device for coupling to one another a pair of cylindrical axial ferrules of optical fiber connectors of any of ST, FC, or SC, all of said connectors having cylindrical axial ferrules of equal, predetermined diameter, said device comprising:

a) a main body having first, inner and outer ends and a first, through bore including coaxial, first and second portions adjoining at a first, internal shoulder;

b) an end cap having second, inner and outer ends and a second through bore including coaxial, third and fourth portions adjoining at a second internal shoulder, said first and third bore portions having a diameter at least as large as said predetermined diameter;

c) a generally cylindrical bushing having opposite ends and inside and outside diameters less and greater than, respectively, said predetermined diameter; and d) means for retaining said main body and end cap in assembled relation with said first and second inner ends in directly opposing relation and said first and second bores coaxial, said bushing being disposed with said opposite ends in said second and fourth bore portions, respectively, between said first and second shoulders, whereby axial ferrules inserted through said first and third bore portions into said bushing are frictionally engaged and releasably retained thereby.

2. The device of claim 1 wherein said retaining means comprise a threaded connection of said main body and said end cap.

3. The device of claim 2 wherein said threaded connection comprises an externally threaded portion of said main body and an internally threaded portion of said end cap.

4. The device of claim 1 wherein said retaining means comprise a snap-fit connection of said main body and said end cap.

5. The device of claim 4 wherein said snap fit connection comprises resilient arm means on one and stepped shoulder means on the other of said main body and said end cap, said arm means including engagement means for cooperative, snap-fit engagement with said shoulder means to retain said main body and said end cap in assembled relation.

6. The device of claim 1 wherein the length of said bushing between said opposite ends is less than the distance between said first and second shoulders when said main body and said end cap are in said assembled relation.

7. The device of claim 1 wherein said opposite ends of said bushing are engaged between said first and second shoulders when said main body and said end cap are in said assembled relation.

8. The device of claim 1 wherein said retaining means provides selective retention of said main body and said end cap in either of a first assembled relation, wherein the length of said bushing between said opposite ends is less than the distance between said first and second shoulders, and a second assembled relation, wherein said opposite ends of said bushing are engaged between said first and second shoulders.

9. The device of claim 1 wherein said bushing is a split spring bushing and is flexed radially outwardly by insertion therein of said ferrules.

10. The device of claim 1 and further comprising spacer means positioned internally of said bushing for contact on opposite sides by end surfaces of ferrules inserted into opposite ends of said bushing, whereby said end surfaces are spaced by the thickness of said spacer means.

11. The device of claim 10 wherein said spacer means comprises a disc-like member having a generally round outer periphery with a diameter approximately equal to said inside diameter of said bushing.

12. The device of claim 11 wherein the material of said member is ruby.

13. The device of claim 11 wherein said bushing is a split spring bushing having an open, axial slit, and said member includes a notch extending into said outer periphery and further including an element engaged in said slit and extending into said notch.

14. The device of claim 1 wherein said end cap includes an internally threaded portion adjoining said second outer end and coaxially communicating with said second bore, said threaded portion being dimensioned for threaded engagement with industry-standard connector ports of optical fiber test equipment.

15. The device of claim 1 wherein at least one of said main body and said end cap includes a cylindrical external surface portion extending for a predetermined axial distance from its outer end and having a second diameter, said device further including an adaptor member having a third, through bore including coaxial, fifth and sixth portions, said fifth portion being internally threaded and dimensioned for threaded engagement with industry-standard connector ports of optical fiber test equipment, and said sixth portion having a diameter substantially equal to said second diameter for insertion therein of said external surface portion.

16. The device of claim 1 and further including a photodetector mounted upon said end cap in position to receive light from the fiber(s) of a ferrule inserted in said bushing.

17. The device of claim 16 wherein said end cap bore includes a fifth portion, and said photodetector includes a cylindrical can portion positioned in said fifth bore portion.

18. The device of claim 17 wherein said end cap bore includes a sixth portion interposed between and having a diameter smaller than both said fourth and fifth portions, whereby the terminal end of a ferrule inserted in said bushing is spaced from said photodetector by at least the axial length of said sixth bore portion.

19. The device of claim 18 and further including means for mounting said device upon test equipment with said photodetector in electrical communication with said equipment.

20. Coupling means for engaging and supporting in a predetermined position the cylindrical ferrule of any of ST, FC, or SC type of optical fiber connectors, each of said type of connectors having a ferrule of equal, predetermined diameter, said ST and FC type connectors having a connector body with a forward part surrounding the ferrule thereof to define an annular space between the ferrule and the forward body part, said coupling means comprising:

a) a cylindrical sleeve having at least one open end and an inside diameter permitting axial insertion of said ferrule into said one end with said sleeve frictionally engaging said ferrule; and b) housing means defining a cavity enclosing said sleeve without obstructing said open end, said housing means including a portion closely surrounding said one end of said sleeve and dimensioned to fit in said annular space between the ferrule and the forward part of ST and FC type connector bodies, the space laterally surrounding said portion of said housing means being unobstructed to permit the ferrule of ST and FC type connectors to be inserted into said sleeve to a depth wherein at least a portion of said housing means is disposed within said annular space.

21. The coupling means of claim 20 wherein said sleeve is a split spring bushing having an axial slot running the length thereof to permit radial expansion from inside and outside diameters d and D, respectively, d being slightly smaller than said predetermined diameter of said cylindrical ferrules.

22. The coupling means of claim 21 wherein said portion of said housing means comprises a cylindrical inner surface with a diameter slightly larger than D and a cylindrical outer surface with a diameter not greater than the outside diameter of said annular space.

23. The device of claim 22 wherein said housing means comprises at least two members and further including means for releasably assembling and disassembling said two members to and from one another to define said cavity containing said sleeve and to permit withdrawal of said sleeve from said cavity respectively.

24. The device of claim 23 wherein said releasable means comprises a threaded engagement of said two members to one another.

25. The device of claim 24 wherein one of said two members includes a third bore, coaxial wit said first and second bores and having threads for connecting said device to an industry-standard connector port of fiber optic test equipment.

26. The device of claim 22 and further including spacer means positioned within said sleeve for contact by the terminal ends of ferrules inserted into opposite ends of said sleeve to maintain said terminal ends in spaced relation a known distance apart while permitting passage of light between the optical fibers of said ferrules.

27. The device of claim 26 wherein said spacer element comprises a disc-like element having a circular periphery having a diameter substantially equal to the inside diameter of said sleeve, said element being coaxially positioned within said sleeve and having an open central portion to permit said passage of light between said fibers.

28. The device of claim 27 wherein said sleeve is a split spring bushing and further including means fixedly attached to said disc-like element and frictionally engaged in the slit in said bushing.

29. The device of claim 22 and further including an adapter having a threaded portion configured for threaded engagement with a connector port of fiber optic test equipment and means for supporting said housing means with said sleeve coaxial with said port.

30. The device of claim 29 wherein said housing means includes an axially extending portion with a cylindrical, external surface, and said supporting means comprises a bore in said adapter for receiving said axially extending portion.

31. The device of claim 22 and further including a photodetector mounted to said housing means.

32. The device of claim 31 and further including means for mounting said device upon test equipment with said photodetector in electrical communication with said equipment.

* * * * *